March 16, 1965   R. J. STARRIETT ETAL   3,173,466
SELF-LOCKING THREADED INSERT
Filed Jan. 25, 1962   2 Sheets-Sheet 2
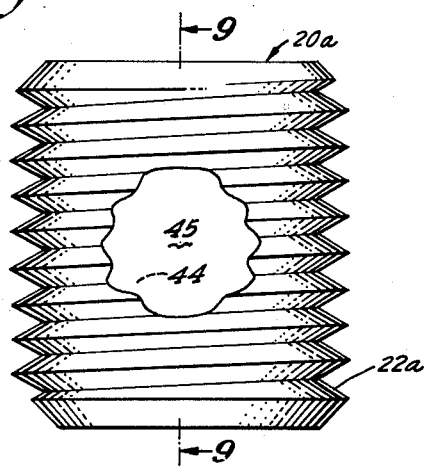
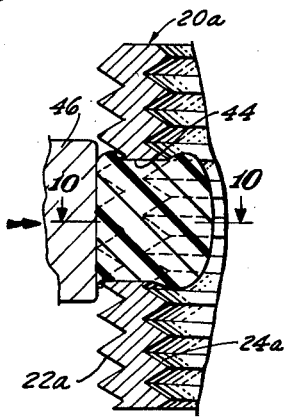
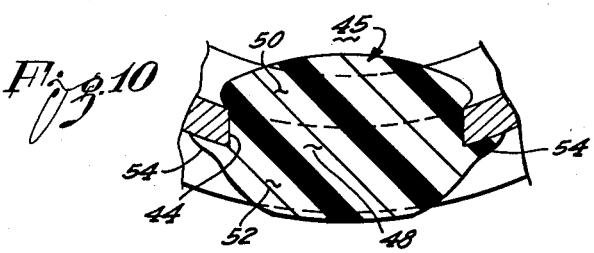
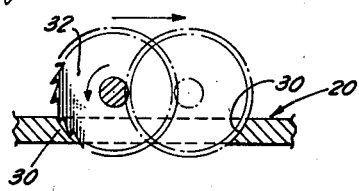
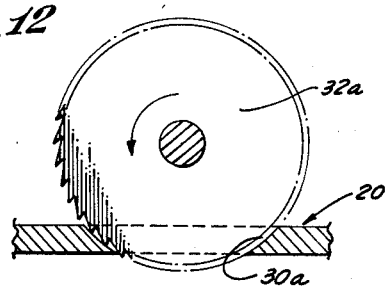
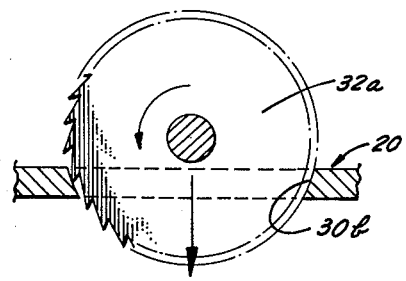
INVENTORS:
Robin J. Starriett
Thomas L. McKay
Attorneys United States Patent Office 3,173,466
Patented Mar. 16, 1965

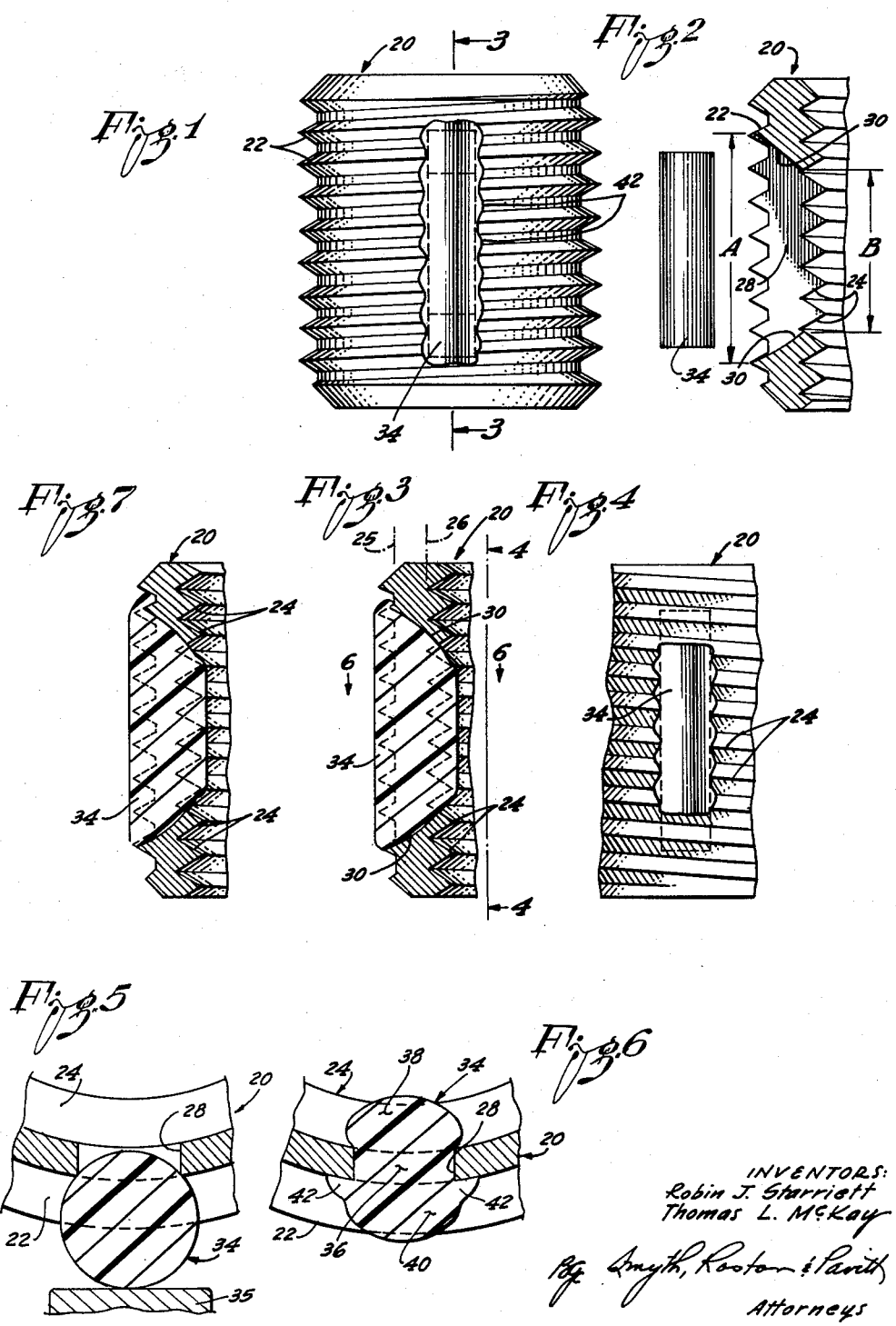

3,173,466
SELF-LOCKING THREADED INSERT
Robin J. Starrlett, Encino, and Thomas L. McKay, Los Angeles, Calif., assignors to Long-Lok Corporation, Los Angeles, Calif., a corporation of California
Filed Jan. 25, 1962, Ser. No. 168,664
10 Claims. (Cl. 151—7)

This invention relates to a self-locking internally and externally screw-threaded fastening sleeve for insertion into a threaded bore of a body to serve as means for anchoring a screw, bolt or similar fastening member to the body. Such sleeves are commonly employed for anchoring screw-threaded fasteners to bodies of relatively soft material such as aluminum or plastic and are especially desirable when the screw-threaded fasteners must be repeatedly loosened or removed.

The self-locking feature of the fastening sleeve of the present invention is provided by employing an insert of resiliently deformable material, the insert being mounted in a constricted manner in an aperture in the cylindrical wall of the fastening sleeve and being oversized relative to the aperture. An insert for this purpose may, for example, be made of such resiliently deformable plastics as nylon, "Teflon," "Kel-F," "Delrin," etc., the requirement being that when the insert is forcibly constricted in cross section it return to its unrestrained configuration when the constricting force is removed.

The invention is based on the concept of forcing such a resiliently deformable plastic insert through a constricting aperture in the cylindrical wall of a threaded fastening sleeve to an assembled position at which a radially inward portion of the insert extends into the interior of the sleeve and a radially outward portion of the insert lies outside the periphery of the sleeve. Since these two radially inward and radially outward portions of the insert are not constricted by the aperture of the fastening sleeve, they are enlarged relative to the aperture and thus interlock the insert with the aperture for effective retention of the insert prior to actual installation of the fastening sleeve.

The invention is also based on the concept of deforming the radially outward portion of the insert into interlocking engagement with the adjacent interrupted ends of the external screw thread of the fastening sleeve. In this regard a feature of the invention is the further concept of forcing the insert into the aperture of the sleeve and laterally deforming the radially outward portion of the insert in a single operation. It has been found that forcing the oversized insert through the aperture in a relatively gradual manner, as distinguished from the application of abrupt impact force, results in extruding the radially inward portion of the plastic insert through the aperture and simultaneously results in deformation of the radially outward portion of the insert into the desired interlocking relation with the adjacent cut ends of the turns of the external screw thread of the sleeve.

The invention further teaches that two special advantages may be obtained by using an elongated aperture in the form of a longitudinal slot in the wall of the sleeve and by using a correspondingly elongated oversized plastic insert. These two advantages are in addition to the fact that an elongated insert is effective over a greater portion of the length of the fastening sleeve.

One of the two advantages of using an aperture in the form of a longitudinal slot in cooperation with an elongated oversized insert is that the laterally deformed portions of the radially outward portion of the insert interlocks with a relatively large number of cut ends of the turns of the external screw thread of the sleeve along the length of the slot. The interlocking of the elongated resilient plastic insert with the external screw thread of the fastening sleeve at numerous spaced points along both longitudinal sides of the insert, in effect, divides the insert into a longitudinal series of independent zones which contribute by resilient action to a cumulative overall axial thrust reaction on the part of the fastening sleeve. This cumulative action by a longitudinal series of independent resilient zones may be understood when it is considered that when the fastening sleeve is engaged with the co-operating screw thread of a bore, the helical advance of the screw thread of the bore into the resilient insert tends to displace the insert bodily longitudinally of the slot but in each instance where the turn of the screw thread of the bore has this longitudinal displacement effect, longitudinal displacement is resisted locally by local anchorage of the insert in the adjacent valleys of the cut turns of the external screw thread of the fastening sleeve. Consequently, in each instance, the insert is locally resiliently distorted with a portion of the insert material under stress between a turn of the screw thread of the bore and an adjacent turn of an external screw thread of the fastening sleeve on opposite sides of the slot. Thus, the resilient plastic insert functions, in effect, as a series of relatively short spring elements instead of functioning as a single relatively long spring element. In this manner, a resilient insert of the invention produces an axial reaction of exceptionally high magnitude on the part of the fastening sleeve.

The second of the two advantages of using an aperture in the form of a slot is that the slot may be formed by a circular rotary cutting tool, such as a side milling cutter, rotating in a plane longitudinally of the fastening sleeve, the rotary cutter being applied in such manner as to form curved shelves at the two ends of the slot. The two shelves support the opposite ends of the insert to prevent the opposite ends from being forced completely into the interior of the fastening sleeve. In addition, the two shelves cooperate with the installation tool to squeeze the two ends of the insert and thus cause increased deformation of the plastic material at the two ends of the insert. Part of the increased deformation is evident in the increased spreading or lateral deformation of the plastic insert at its two ends. Another part of the increased displacement of the two ends of the plastic insert is towards the edges of the two shelves and radially inwardly past the edges of the shelves to increase the radially inward bulge of the insert into the interior of the fastening sleeve.

A feature of the preferred practice of the invention is that the external screw thread of the fastening sleeve is a rolled truncated thread. The forming of the external screw thread by a rolling action has a highly desirable effect in increasing the density of the metal of the fastening sleeve adjacent its peripheral surface.

The truncating of the external screw thread has a number of advantages. In the first place, the reduction in the radial dimension of the external screw thread lessens the reduction in the effective thickness of the wall of the fastening sleeve by the external screw thread. In the second place, truncating the external screw thread increases its minor diameter and the minor diameter may be increased in this manner slightly beyond the minor diameter of the screw thread of the bore in which the fastening sleeve is to be used. The resulting metal-to-metal interference of the fastening sleeve with the screw thread of the bore provides a supplemental self-locking action for retention of the sleeve in the bore. In the third place, the truncating of the external screw thread reduces the clearance around the periphery of the installed fastening sleeve to cause increased deformation of the plastic insert by the screw thread of the bore with resulting increase in the locking action by the radially outward portion of the plastic insert.

The features and advantages of the invention may be understood from the following detailed description, and the accompanying drawings.

In the drawings, which are to be regarded as merely illustrative:

FIG. 1 is a side elevation of a selected embodiment of the invention ready for insertion into the threaded bore of a body;

FIG. 2 is a view partly in section and partly in side elevation showing a plastic body positioned for insertion into a slot of a fastening sleeve;

FIG. 3 is a longitudinal radial section of the fastening sleeve and the plastic insert therein, the section being taken along the line 3—3 of FIG. 1;

FIG. 4 is a view of the interior of the fastening sleeve as seen along the line 4—4 of FIG. 3;

FIG. 5 is an enlarged fragmentary transverse section of the fastening sleeve showing how an elongated plastic body of greater width than the slot in the sleeve may be positioned along the radially outward side of the slot in preparation for the forcing of the insert into the slot by a ramming tool;

FIG. 6 is a fragmentary sectional view similar to FIG. 5 showing the installed insert, the section being taken along the offset line 6—6 of FIG. 3;

FIG. 7 is a view similar to FIG. 3 showing a thinner walled fastening sleeve;

FIG. 8 is a side elevational view of a self-locking fastening sleeve which has a resiliently deformable plastic insert of generally circular configuration mounted in a radial bore in the cylindrical wall of the fastening sleeve;

FIG. 9 is a longitudinal section taken along the line 9—9 of FIG. 8;

FIG. 10 is a transverse section on an enlarged scale taken along the line 10—10 of FIG. 9;

FIG. 11 is a diagrammatic view showing how a rotary circular cutter may be used to cut a slot in the cylindrical wall of a fastening sleeve, the cylindrical cutter being relatively small in diameter and being shifted in the course of the cutting operation to elongate the slot;

FIG. 12 is a diagrammatic view showing how a rotary cutter of relatively large diameter may be used to cut a slot formed with shelves at the opposite ends of the slot; and FIG. 13 is a view similar to FIG. 12 showing how the same rotary cutter may be used to cut deeper and thereby not only elongate the slot in the fastening sleeve but also shorten the shelves at the opposite ends of the slot.

In the embodiment of the invention shown in FIGS. 1–6, a fastening sleeve, generally designated 20 has an external screw thread 22 and an internal screw thread 24. The external screw thread 22 has a minor diameter indicated by the line 25 in FIG. 3 and the internal screw thread 24 has a major diameter indicated by the line 26. The radial distance between these two lines may be termed the effective thickness of the fastening sleeve 20 since this thickness determines the structural strength of the sleeve. In this particular embodiment of the invention the external screw thread 22 is a truncated screw thread as may be seen in FIG. 3. The truncated screw thread is produced by a rolling operation with consequent increase in the density of the material of the fastening sleeve adjacent the outer circumferential surface of the sleeve.

As best shown in FIGS. 2 and 5, the fastening sleeve 20 is provided with an elongated aperture in the form of a slot 28 that is of uniform width and terminates short of each end of the sleeve. While such a slot may be cut with a straight wall router, a feature of this practice of the invention is that a rotary cutter such as an end mill cutter is employed to form the slot 28, the cutter being applied in such manner as to form a curved end shelf or outwardly facing shoulder 30 at each end of the slot. As a result, the length dimension A of the radial outer side of the slot indicated in FIG. 2 is greater than the length dimension B of the radially inner side of the slot.

The slot 28 may be cut in the manner indicated in FIG. 11 by means of a thin rotary cutter 32 of relatively small diameter which is applied to cut into the sleeve to the depth indicated and is then shifted in its plane of rotation to elongate the slot to whatever extent is desired. In one example wherein the inside diameter of the fastening sleeve is ¼ inch and the outside diameter is 5/16 inch, the rotary cutter 32 is ¼ inch in diameter and is of a width to cut a slot .050 inch wide, the cutter being shifted in its plane of rotation for the desired length of the slot. FIG. 2 shows the relative dimensions of a solid cylindrical body 24 of resiliently deformable plastic for mounting in the slot 28. With the slot approximately .050 inch wide, the diameter of the plastic body 34 is on the order of .065–.075 inch. The initial length of the body 34 is preferably somewhat shorter than the outside length dimension A of the slot 28 but may be either slightly longer or slightly shorter than the relative length indicated in FIG. 2.

FIG. 5 shows the solid cylindrical plastic body 34 positioned adjacent the outer side of the slot 28 with a tool 35 poised to ram the body into the slot. The tool 35 is advanced in a relatively gradual manner as contrasted with the use of abrupt impact force. The somewhat gradual ramming action gives the resilient plastic body 34 an opportunity to squeeze into the restricting slot 28 and to extrude slightly beyond the slot into the interior of the fastening sleeve.

Referring to FIG. 6, the intermediate portion 36 of the installed plastic body 34 that remains in the slot 28 is resiliently constricted by the slot and consequently exerts pressure against the surrounding slot walls to provide frictional resistance to any forces that may tend to dislodge the insert from the slot. In addition, a radially inward portion 38 of the plastic insert 34 expands from its restricted state to form an enlargement of substantially greater cross sectional dimension than the slot 28. As may be seen in FIG. 4, the radially inward portion 38 of the installed insert bulges at numerous points at the valleys of the cut threads of the internal screw thread 24 of the sleeve. In like manner, a radially outward portion 40 of the plastic insert 34 is enlarged to substantially greater cross sectional dimension than the slot 28. Thus the inner and outer portions 38 and 40 of the plastic insert 34 effectively interlock the insert with the slot 28 for highly efficient anchorage of the insert in the fastening sleeve.

The ramming force by the tool 35 against the plastic body 34 deforms the radially outward portion 40 of the insert by laterally spreading the material of the insert into the valleys of the adjacent cut ends of the turns of the external screw thread 22. FIG. 1 shows how the ramming tool causes the insert body 34 to be formed with lateral projections or bulges 42 at the valleys of the cut turns of the external screw thread 22. FIG. 6 shows the same lateral projections or bulges 42 in profile.

As heretofore noted, the curved shelves 30 at the opposite ends of the slot 28 keep the ramming tool 35 from completely displacing the opposite ends of the plastic body 34 into the interior of the fastening sleeve and the shelves also cooperate with the ramming tool 35 to deform the opposite ends of the plastic body. The degree of this deformation at the opposite ends of the insert body may be controlled by varying the length of the insert body 34 relative to the length dimension A of the slot 28 and by varying the inclination of the two end shelves 30.

The manner in which the fastening sleeve 20 serves its purpose may be readily apparent from the foregoing description. When the fastening sleeve 20 is threaded into a threaded bore, the penetration of the thread of the bore into the material of the insert 34 at longitudinally spaced points of the insert tends to shift the insert longitudinally in the slot 28, but the multiple anchorages provided by the marginal projections or bulges 42 prevent such longitudinal shift of the insert. Thus, the screw thread of the bore creates a local longitudinal distortion of the insert in the region of each turn of the external screw thread 22 of the fastening sleeve to result in a cumulative longitudinal reaction thrust by the plastic insert which reaction thrust is transmitted to the fastening sleeve 20 and causes the external screw thread 22 of the fastening sleeve to thrust axially against the screw thread of the bore. Since numerous turns of both screw threads are involved, this axial reaction thrust involves the pressure engagement of a relatively large total area of screw thread surfaces.

The insertion of the fastening sleeve 20 into a threaded bore with consequent radially resilient deformation of the radially outward portion 40 of the plastic insert creates a lateral diametrical reaction thrust against the fastening sleeve. This sidewise thrust of the fastening sleeve 20 presses the external screw thread 22 of the sleeve against the surrounding inner screw thread of the bore throughout a longitudinal zone that is diametrically opposite from the longitudinal zone of the insert 34.

It is apparent that the above-described axial reaction thrust of the fastening sleeve together with the described lateral reaction thrust creates effective frictional engagement between the external screw thread 22 of the sleeve and the surrounding female thread of the bore to lock the sleeve frictionally against loosening or retraction from the threaded bore in which it is inserted. In addition the frictional contact of the elastically deformed insert material with the inner thread of the bore further resists loosening rotation of the sleeve 20.

If the minor diameter 25 of the external screw thread 22 of the sleeve 20 exceeds slightly the minor diameter of the screw thread of the bore in which the fastening sleeve 20 is installed there will be interference between the sleeve and the thread of the bore. This metal-to-metal interference provides further frictional resistance to loosening or removal of the installed fastening sleeve.

As heretofore noted, the inner radial portion 38 of the plastic insert 34 bulges into the valleys of the cut turns of the internal screw thread 24 of the fastening sleeve. When a screw or bolt is screwed into the installed fastening sleeve, the advancing thread of the screw or bolt further deforms the material of the plastic insert into the valleys of the cut turns of the screw thread. It is apparent that the resilient insert 34 cooperates with the screw thread of the screw or bolt in the same manner as the resilient insert cooperates with the internal screw thread of the bore in which the fastening sleeve is mounted. Thus the radially inward bulging portion 38 of the resilient insert 34 causes both axial and lateral thrust of the screw thread of the screw or bolt against the internal screw thread 24 of the fastening sleeve.

As heretofore noted, truncating the external screw thread 22 of a fastening sleeve 20 increases the effective thickness of the sleeve and thus increases the strength of the sleeve. If desired however, the truncating of the external sleeve thread 22 may be utilized primarily to permit a fastening sleeve to be relatively thin in effective thickness. Such a thin sleeve may be highly useful where it is desired to use the sleeve to anchor a bolt or screw of maximum diameter in a threaded bore of a given diameter.

In general, the length of the slot 28 is varied in accord with the desired torque resistance to loosening of the fastening sleeve in the bore in which it is mounted. If a slot of a given length dimension A is provided for a desired torque resistance to loosening of the fastening sleeve in the bore, the torque resistance to loosening of the screw or bolt in the sleeve may be varied by varying the ratio of the length dimension B to the length dimension A. Thus the dimension of the shelves 30 lengthwise of the slot 28 may be varied not only to vary the squeezing action on the opposite ends of the insert but also to vary the torque resistance to withdrawal of the screw or bolt that is threaded into the fastening sleeve.

Referring to FIGS. 11, 12 and 13, it is apparent that the inclination of the two shelves 30 at the opposite ends of the slot and the dimension of the two shelves lengthwise of the slot may be controlled by varying the diameter of the rotary cutter and by varying the depth to which the rotary cutter is advanced into the fastening sleeve radially of the sleeve. In FIG. 11, for example, the two shelves 30 formed by the cutter 32 may be lengthened either by reducing the diameter of the cutter 32 or by retracting the cutter slightly radially away from the fastening sleeve. In like manner, the shelves 30a cut by the rotary cutter 32a in FIG. 12 may be lengthened either by reducing the diameter of the cutter 32a or by slightly retracting the cutter away from the sleeve. FIG. 13 shows how the same cutter 32a may be shifted towards the sleeve to cut a longer slot and at the same time form shorter and steeper shelves 30b at the opposite ends of the slot. From these examples it will be clear that the ratio of the length dimensions A and B may be varied for different torque resistance requirements inside the fastening sleeve.

FIGS. 8, 9 and 10 show a second embodiment of the invention in which a fastening sleeve 20a has an external screw thread 22a and the usual internal screw thread 24a. The fastening sleeve has a radial bore or circular aperture 44 which cuts a plurality of the turns of both the external and the internal screw threads. An insert, generally designated 45, in the form of a resiliently deformable plastic body of the character heretofore described is mounted in the circular aperture 44. Initially, i.e. before being mounted in the fastening sleeve 20a, the plastic insert 45 is a relatively short solid cylindrical body that is oversized in diameter relative to the diameter of the circular aperture 44. For installation the plastic insert is positioned at the circular aperture 44 concentrically thereof and then is forced into the aperture by a ramming tool 46 in the previously described manner.

The installed plastic insert 45 has the usual three portions, namely, an intermediate portion 48 which is resiliently constricted by the surrounding wall of the circular aperture 44, an inner radial portion 50 which bulges into the interior of the fastening sleeve and is enlarged to greater cross section than the circular bore, and an outer radial portion 52 which protrudes outward from the fastening sleeve and is also of larger cross section than the circular aperture. The pressure of the ramming tool 46 against the outer radial portion 52 causes the outer radial portion to be deformed laterally into the valleys of the cut turns of the external screw thread 22. Thus FIG. 8 shows how the outer radial portion of the insert 45 is formed with lateral bulges 54 that interlock with the valleys of the screw thread and FIG. 10 shows the same lateral bulges in profile.

My description in specific detail of the selected embodiments of the invention will suggest various changes, substitutions and other departures from my disclosure within the spirit and scope of the appended claims.

We claim:

1. A self-locking fastening sleeve for installation in a threaded bore in a body to anchor a threaded fastening member to the body, comprising:

a hollow cylindrical member having an external screw thread to screw into said bore and an internal screw thread for engagement by said fastening member, said cylindrical member having an aperture in its cylindrical wall spaced from its opposite ends and cutting the turns of said external and internal screw threads; and a deformable resilient plastic insert of a thickness greater than the thickness of the wall of said hollow cylindrical member, said wall being defined by the root diameter of said internal and external screw threads, said plastic insert being mounted in said aperture with its radial outward portion extending into the radial region of said external screw thread for frictionally resisting rotation of the cylindrical member in the bore, the radially inward portion of the insert extending into the radial region of said internal screw thread for frictionally resisting rotation of said fastening member relative to the cylindrical member, both of said outward and inner portions of the insert being enlarged in cross sectional area relative to the cross sectional area of said aperture to interlock the insert with the aperture prior to installing said sleeve in said threaded bore, said outward portion of the insert protruding laterally of the insert into interlocking engagement with the cut turns of said external screw thread for compression between the cylindrical member and the wall of said bore.

2. A combination as set forth in claim 1 in which the portion of said insert that is intermediate said outward and inward portions has a cross sectional area when unrestrained that is greater than the cross sectional area of said aperture whereby the intermediate portion is resiliently compressed by confinement in the aperture with consequent retaining pressure by the intermediate portion of the insert against the adjacent surfaces of the aperture.

3. A combination as set forth in claim 1 in which said external screw thread of the sleeve is truncated at the root thereof to increase the thickness of the wall of the sleeve between the minor diameter of the external screw thread of the sleeve and the major diameter of the internal screw thread of the sleeve.

4. A combination as set forth in claim 1 in which said aperture is shorter on its radially inward side than on its radially outward side thereby forming shelves at each end of the slot on its radially inner side to support the opposite ends of the insert against radially inward displacement into the interior of the cylindrical member.

5. A self-locking fastening sleeve for installation in a threaded bore in a body to anchor a threaded fastening member to the body, comprising:
   a hollow cylindrical member having an external screw thread to screw into said bore and an internal screw thread for engagement by said fastening member,
   said cylindrical member having a circular aperture in its cylindrical wall cutting the turns of said internal and external screw threads; and
   a deformable resilient plastic insert mounted in said aperture with its radially outward portion extending into the radial region of said external screw thread beyond the root diameter thereof for frictionally resisting rotation of the cylindrical member in the bore, the radially inward portion of the insert extending into the radial region of said internal screw thread beyond the root diameter thereof for frictionally resisting rotation of said fastening member relative to the cylindrical member,
   both of said outward and inner portions of the insert being enlarged in cross sectional area relative to the cross sectional area of said aperture to interlock the insert with the aperture prior to installing said sleeve in said threaded bore,
   said outward portion of the insert protruding laterally of the insert into interlocking engagement with the cut turns of said external screw thread for compression between the cylindrical member and the threaded wall of the bore.

6. A method of fabricating a self-locking sleeve for installation in a threaded bore in a body to anchor a threaded fastening member to the body, including the steps of:
   forming a sleeve with an external screw thread to screw into said bore and with an internal screw thread to engage said fastening member;
   forming a longitudinal slot-like opening in the sleeve terminating short of the two ends of the sleeve,
   with the length of the radially inward side of the opening shorter than the length of the radially outward side of the opening to provide outwardly directed shoulders at each end of the opening;
   providing an elongated insert of resiliently deformable plastic material of greater width than the width of the opening; and
   applying force to said insert laterally thereof to force the insert into the opening until a portion of the insert extends into the interior of the sleeve and expands to greater width than the opening, the applied force deforming the radially outward side of the insert into interlocking engagement with the cut turns of the external screw thread of the sleeve adjacent the side edges of the opening, said shoulders at the opposite ends of the slot engaging the opposite ends of the insert to keep the opposite ends of the insert from being displaced into the interior of the sleeve.

7. A method of fabricating a self-locking sleeve for installation in a threaded bore in a body to anchor a threaded fastening member to the body, including the steps of:
   forming a sleeve with an external screw thread to screw into said bore and with an internal screw thread to engage said fastening member;
   cutting a longitudinal slot of uniform width through the wall of said sleeve terminating short of the two ends of the sleeve with the slot cutting numerous turns of the outer and inner screw threads of the sleeve and of a length on the radially inward side shorter than the length of the radially outward side to provide outwardly directed shoulders at each end of the slot;
   providing an elongated insert of resiliently deformable plastic material of greater width than the width of the slot; and
   applying force to said insert laterally thereto to force the insert into the slot until a portion of the insert extends into the interior of the sleeve and expands to greater width than the slot, the applied force deforming the radially outward side of the insert into interlocking engagement with the cut turns of the external screw thread of the sleeve adjacent the side edges of the slot, said shoulders at the opposite ends of the slot engaging the opposite ends of the insert to keep the opposite ends of the insert from being displaced into the interior of the sleeve by said force.

8. A self-locking fastening sleeve for installation in a threaded bore in a body to anchor a threaded fastening member to the body, comprising:
   a hollow cylindrical member having an external screw thread to screw into said bore and an internal screw thread for engagement by said fastening member,
   said cylindrical member having an aperture in its cylindrical wall spaced from its opposite ends and cutting the turns of said external and internal screw threads, said wall of said cylindrical member being defined by the root diameter of said threads, and
   a deformable resilient plastic insert of a thickness greater than the thickness of the wall of said hollow cylindrical member mounted in said aperture with its radial outward portion extending beyond the root diameter of said external screw thread for frictionally resisting rotation of the cylindrical member in the bore, the radially inward portion of the insert extending beyond the root diameter of said internal screw thread for frictionally resisting rotation of said fastening member relative to the cylindrical member,
   both of said outward and inner portions of the insert being enlarged in cross-sectional area relative to the cross-sectional area of said aperture to interlock the insert with the aperture prior to installation in said threaded bore, said outward portion of the insert protruding laterally of the insert into interlocking engagement with the cut turns of said external screw thread for compression between the cylindrical member and the wall of said bore.

9. A self-locking fastening sleeve for installation in a threaded bore in a body to anchor a threaded fastening member to the body, comprising:

a hollow cylindrical member having an external screw thread to screw into said bore and an internal screw thread for engagement by said fastening member, said cylindrical member having an aperture through the effective thickness of its cylindrical wall spaced from its opposite ends and cutting the turns of said external and internal screw threads; and a deformable resilient plastic insert of a thickness greater than the effective thickness of the wall of said hollow cylindrical member mounted in said aperture with its radial outward portion extending into the radial region of said external screw thread for frictionally resisting rotation of the cylindrical member in the bore, the radially inward portion of the insert extending into the radial region of said internal screw thread for frictionally resisting rotation of said fastening member relative to the cylindrical member, both of said outward and inner portions of the insert being enlarged in cross-sectional area relative to the cross-sectional area of said aperture to interlock the insert with the aperture prior to installation in said threaded bore, said outward portion of the insert protruding laterally of the insert into interlocking engagement with the cut turns of said external screw thread for compression between the cylindrical member and the wall of said bore.

10. A self-locking fastening sleeve for installation in a threaded bore in a body to anchor a threaded fastening member to the body, comprising:

a hollow cylindrical member having an external screw thread to screw into said bore and an internal screw thread for engagement by said fastening member, each of said threads having a pitch diameter, said cylindrical mmeber having an aperture in its cylindrical wall spaced from its opposite ends and cutting the turns of said external and internal screw threads, and a deformable resilient plastic insert of a thickness greater than the thickness of the wall of said hollow cylindrical member mounted in said aperture with its radial outward portion extending into the radial region of said external screw thread a distance substantially of the distance between the pitch diameter of said screw threads for frictionally resisting rotation of the cylindrical member in the bore, the radially inward portion of the insert extending into the radial region of said internal screw thread for frictionally resisting rotation of said fastening member relative to the cylindrical member, both of said outward and inner portions of the insert being enlarged in cross-sectional area relative to the cross-sectional area of said aperture to interlock the insert with the aperture prior to installation in said threaded bore, said outward portion of the insert protruding laterally of the insert into interlocking engagement with the cut turns of said external screw thread for compression between the cylindrical member and the wall of said bore.

References Cited by the Examiner
UNITED STATES PATENTS

| | | | |
|---|---|---|---|
| 2,544,096 | 3/51 | Laughlin | 151—7 |
| 2,725,915 | 12/55 | Johnson | 151—7 |
| 2,766,080 | 10/56 | Fineran | 151—7 |
| 2,913,031 | 11/59 | McKay et al. | 151—7 |
| 2,980,929 | 4/61 | Cummaro | 10—10 |
| 3,020,570 | 2/62 | Wallace et al. | 10—10 |
| 3,039,508 | 6/62 | Greene | 151—7 |
| 3,081,808 | 3/63 | Rosan et al. | 151—41.73 |

EDWARD C. ALLEN, *Primary Examiner.*

CARL W. TOMLIN, *Examiner.*